Sept. 22, 1970   E. G. RODRIGUEZ   3,529,609
HAIR DRESSING COMB
Filed Feb. 9, 1968
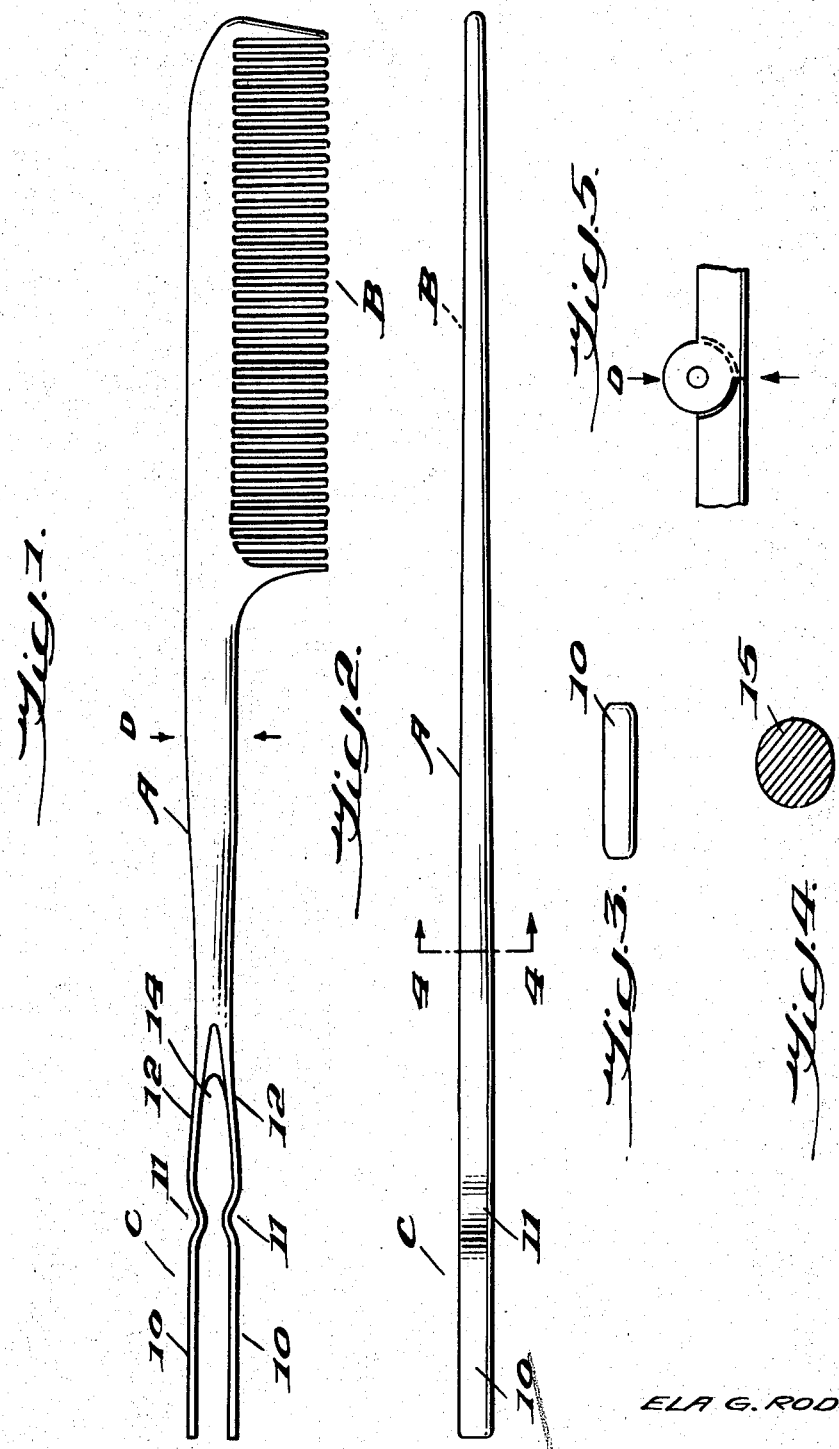
INVENTOR
ELA G. RODRIGUEZ,
BY  Hall & Houghton
ATTORNEY

United States Patent Office 3,529,609
Patented Sept. 22, 1970

3,529,609
HAIR DRESSING COMB
Ela Gonzalez Rodriguez, now by change of name Ela Keen, 740 SW. 10th Ave., Miami, Fla. 33130
Miami, Fla. 33130
Filed Feb. 9, 1968, Ser. No. 704,395
Int. Cl. A45d 24/00
U.S. Cl. 132—148                                    9 Claims

ABSTRACT OF THE DISCLOSURE

An improved multi-purpose comb is provided comprising a handle having a hair teasing and smoothing comb body at one end an a special form of two pronged fork at the other particularly adapted for lifting and shaping particular groups of hairs or locks of hair and aligning the same for styling and shaping the desired coiffure. The fork is made up of knock-kneed tines with substantially parallel rigid thin rectangular shanks and an open-eyed crotch, and the outer surfaces of the shanks are indented at the knees thereof, for controlling relative longitudinal motion of the tines and hair. Other advantages and details of the construction are disclosed.

BACKGROUND OF THE INVENTION

Field of the invention

The invention relates to hair dressing combs of the type having a handle carrying a comb body and a fork at its opposite ends (class 132).

Description of prior art

In known combs of this type forks made up of wires and of needle-like tines have been provided, but such devices have had various disadvantages, and have not been as well adapted for performing coiffing operations as is desirable.

SUMMARY OF THE INVENTION

The present invention provides an improved device of this character in which the two-pronged fork is made up of two knock-kneed tines with a crotch area inwardly of the knee area in the form of a smooth eye having a restricted opening thereinto between the knees, and with shanks of substantially parallel, rigid, rectangular-form, such fork elements being proportioned to impart particular utilities to the device.

BRIEF DESCRIPTION OF THE DRAWINGS

In the accompanying drawings of a preferred embodiment of the invention:

FIG. 1 is a side elevation of the device;
FIG. 2 is a plan view thereof;
FIG. 3 is an end view of one of the tines on an enlarged scale;
FIG. 4 is a cross-section taken on the line 4—4 or FIG. 2, on an enlarged scale;
FIG. 5 is a side elevation of a modification.

DESCRIPTION OF PREFERRED EMBODIMENTS

In the preferred embodiment of hair dressing comb shown in FIGS. 1–4, the new device comprises a handle member A, having a toothed comb body B of any suitable type at one end portion thereof and a two pronged fork C at the other end portion thereof. Handle A may be hinged at D for folding as indicated in FIG. 5, but preferably is rigid.

In accordance with the invention, the new device is particularly characterized as follows: The two pronged fork C is made up of two knock-kneed tines having shank portions 10, knee portions 11, and crotch area embracing portions 12. The shanks 10 of the tines, projecting outwardly from the knees 11 thereof, are substantially parallel to each other and have substantially parallel rectangular cross-sections (FIG. 3) which lie parallel to each other (FIGS. 1 and 2). In the preferred embodiment the parallel shank portions are substantially rigid, are approximately three-sixteenths of an inch wide and about one thirty-second of an inch thick, nad are spaced apart approximately one-fourth inch, while the knock-kneed portions 11 are spaced apart approximately one-eighth inch. The crotch portion 14 of the fork C inwardly of the knees 11 of the tines, is in the form of a smooth eye having a restricted opening thereinto between the knees 11. As best shown in FIG. 1 the knees 11 are preferably rounded in longitudinal cross-section and are joined to the shanks 10, and preferably also to the crotch or eye embracing portions 12, by arcuate sections. The outer surfaces of the tines at the knee portions 11 are also indented, as shown herein by displacing the tine walls to form the indented and knock-kneed configuration, as shown.

The tines as above noted, are substantially rigid, and to have such rigidity despite the small cross sections thereof, are preferably made of stainless steel, and in the preferred embodiment of the drawings the entire assembly A, B, C is made of stainless steel as a unitary body, which contributes to long life and facilitates sterilizing.

The handle A, in the form shown, has a substantially flat sided portion between the comb and fork portions B and C, and also has a section 15 (FIG. 4) of substantially cylindrical cross-section, between said sections B and C, for facilitating manipulation of the device.

The use of the coiffing tool thus provided may be exemplified by its employment in producing an intricate coiffure including teased hair and particularly arranged hair loops. The comb portion C in such case will be of a type adapted for teasing, and is used to tease the head of hair and give it body and height. The lifting and shaping of the hair, during and after the teasing, is particularly facilitated by the knock-kneed tine construction of the work. In the form described his element may be employed to shape a small area or a relatively large area of the hair into a line for the particular style desired by the user. By smoothing the hair out, spreading or pulling it in all directions, the user can style and shape a few hairs or a particular lock of hair at a time into the desired coiffure.

The spacing of the two parallel tines at about one-fourth inch apart is an important matter, as it allows a small section of the hair to be selected and worked on at a time. A substantially greater separation of the tines would make it much more difficult for the user to select, lift, shape and style the hair in a small area or in the form of a lock flat both in its extent and near the hair-roots to obtain the desired result. The knock-kneed configuration of the tines is especially important. It aids in catching the hair and avoiding undesired slipping of the caught lock longitudinally from the tines. A small lock, slid into the eye section 14, is especially well held for shaping and styling as desired; and a large lock, partly slid into the eye section 14, is retained partly therein, and partly in the space between the knees 11 and between the shanks 10, the entangling of the hairs of the lock, especially when teased, retaining it in place for final styling. The indentation of the outer walls of the tines at the knee portions 11 also aids in preventing the tines from going completely through a lock being selected, and a lock may be additionally held in place by wrapping it one or more times about the knee area 11, which will then prevent it from sliding up onto the handle portion A, or off the tine portion 11, until the operator desires to release it. When the oval or substantially circular section 15 is provided, the tool may be rolled by the operator between the thumb and fingers of one hand for wrapping about the knee portion 11 a lock passed through the space between the tines, while the lock is held with the free hand. Also, as is well known, some subjects suffer from itching or tickling of the scalp during coiffing operations. The parallel, thin, substantially rigid, tines of the fork C are well adapted for insertion through the coiffure for scratching the scalp after the hair has been set without disturbing too great an area therein. Edges and corners preferably are slightly rounded, as shown, for safety and appearance.

While there have been described herein what are at present considered preferred embodiments of the several features of the invention, it will be obvious to those skilled in the art that modifications and changes may be without departing from the essence of the invention. It is therefore to be understood that the exemplary embodiments thereof are illustrative and not restrictive of the invention, the scope of which is defined in the appended claims.

What is claimed is:

1. A hair dressing comb of the type that comprises, in combination,
   (a) a handle member,
   (b) a toothed comb body at one end portion of said handle member, and
   (c) a two pronged fork at the other end portion of the handle member, particularly characterized in that
   (d) said two pronged fork is made up of two knock-kneed tines, having shank portions, knee portions, and crotch embracing portions
   (e) the shank portions of said tines, projecting outwardly from the knee portions thereof, are substantially parallel to each other and have substantially rectangular cross-sections parallel to each other and spaced approximately one-fourth inch apart,
   (f) the knee portions of said tines are spaced approximately one-eighth inch apart, and
   (g) the crotch embracing portions of said fork, inwardly of the knee portions of said tines, are in the form of a smooth eye having a restricted opening thereinto between said knee portions.

2. A hair dressing comb as claimed in claim 1, further characterized in that
   (h) said tine shank portions have cross sections approximately three-sixteenths of an inch wide and approximately one thirty-second of an inch thick, and
   (i) said tines are formed of stainless steel and are substantially rigid despite the small cross-sections thereof.

3. A hair dressing comb as claimed in claim 1, further characterized in that
   (h) said handle between said comb body and fork has a section of substantially cylindrical cross section.

4. A hair dressing comb as claimed in claim 1, further characterized in that
   (h) said handle between said comb body and fork has a substantially flat sided section and also a section of substantially cylindrical cross section.

5. A hair dressing comb as claimed in claim 1, further characterized in that
   (h) the knee portions of said tines are rounded in longitudinal cross section and are joined to said shank portions by arcuate sections.

6. A hair dressing comb as claimed in claim 1, further characterized in that
   (h) the knee portions of said tines are rounded in longitudinal cross-section and are joined to the eye embracing portions of said tines by arcuate sections.

7. A hair dressing comb as claimed in claim 1, further characterized in that
   (h) the knee portions of said tines are rounded in longitudinal cross section and are joined to said shank portions and to the eye embracing portion of said tines by arcuate sections.

8. A hair dressing comb as claimed in claim 1, further characterized in that
   (h) the outer surface of said tines at the knee portions thereof are indented.

9. A hair dressing comb as claimed in claim 1, further characterized in that
   (h) the entire structure is formed of stainless steel as a unitary body.

References Cited
UNITED STATES PATENTS

| | | | |
|---|---|---|---|
| D. 203,734 | 2/1966 | Lutz | D86—8 |
| D. 206,206 | 11/1966 | Battaglia | D86—8 |
| 2,154,120 | 4/1939 | Berliner | 132—33 |
| 2,225,123 | 12/1940 | Madore | 132—33 |
| 3,145,718 | 8/1964 | Pigo | 132—148 |

E. BARRY SHAN, Primary Examiner

G. E. McNEILL, Assistant Examiner

U.S. Cl. X.R.
132—122